US008224691B1

(12) United States Patent  
Scroggie et al.

(10) Patent No.: US 8,224,691 B1  
(45) Date of Patent: Jul. 17, 2012

(54) SYSTEM AND METHOD FOR DISTRIBUTING INFORMATION THROUGH COOPERATIVE COMMUNICATION NETWORK SITES

(75) Inventors: Michael C. Scroggie, Laguna Niguel, CA (US); David A. Rochon, Westport, CT (US); David W. Banker, Mount Baldy, CA (US); Will Gardenswartz, Denver, CO (US)

(73) Assignee: Catalina Marketing Corporation, St. Petersburg, FL (US)

( * ) Notice: Subject to any disclaimer, the term of this patent is extended or adjusted under 35 U.S.C. 154(b) by 0 days.

(21) Appl. No.: 09/505,632

(22) Filed: Feb. 16, 2000

(51) Int. Cl.  
*G06Q 99/00* (2006.01)

(52) U.S. Cl. ............... 705/14.1; 705/14.11; 705/14.22; 705/14.23; 705/14.39

(58) Field of Classification Search .................. 705/14, 705/16, 26, 27, 1, 500, 14.1, 14.11, 14.22, 705/14.23, 14.39  
See application file for complete search history.

(56) References Cited

U.S. PATENT DOCUMENTS

| | | | |
|---|---|---|---|
| 4,723,212 A | 2/1988 | Mindrum et al. | |
| 4,882,675 A | 11/1989 | Nichtberger et al. | 705/14 |
| 4,949,256 A | 8/1990 | Humble | 705/14 |
| 5,056,019 A * | 10/1991 | Schultz et al. | 705/14 |
| 5,249,044 A | 9/1993 | Von Kohorn | 348/12 |
| 5,285,278 A | 2/1994 | Holman | 348/10 |
| 5,287,181 A | 2/1994 | Holman | 348/473 |
| 5,347,632 A | 9/1994 | Filepp et al. | 709/202 |

(Continued)

FOREIGN PATENT DOCUMENTS

EP 0 512 509 A2 11/1992

(Continued)

OTHER PUBLICATIONS

Wilbert, Tony "Now Shoppers Can Clip Coupons Off the Internet" Atlanta Business Chronicle, Sep. 1996.*  
Crusing for food savings on Internet, San Diego Union-Tribune p. Cl, Apr. 20, 1996.*  
Peterson, Laurie, "Click here for coupons" Direct p. 45, Jun. 1, 1996.*

(Continued)

*Primary Examiner* — Akiba Robinson Boyce  
(74) *Attorney, Agent, or Firm* — Pillsbury Winthrop Shaw Pittman LLP

(57) ABSTRACT

Information pertaining to products made by manufacturers and sold to consumers through retailers, is distributed to consumers through a communication network that connects consumer communication nodes to a cooperative network site having an accumulation of information about manufacturer product offers and retailer special deals. A consumer can obtain selected items of this information without knowledge of how to reach the cooperative network site, by simply logging in to a manufacturer network site or to a retailer network site. At a manufacturer site, the consumer can obtain a list of local retailers carrying the manufacturer offers and can then select from among the offers and receive complete details of the selected offers. At a retailer site, the consumer can obtain a list of manufacturer offers available at the retailer stores in the consumer's area, and can then select from among the available offers and receive their complete details. An additional feature of the invention makes use of a consumer "personal page," which is an individualized database in which consumer shopping preferences are defined, both by information that the consumer expressly provides and by the consumer's past shopping activity. Use of the personal page allows the consumer to receive product offers that are more targeted to the individual consumer, thus saving the consumer time and effort. Another embodiment of the invention provides for distribution of a product purchase incentive directly to the consumer in response to his or her selection of an advertising banner displayed on an independent commercial network site.

9 Claims, 7 Drawing Sheets

U.S. PATENT DOCUMENTS

| | | | |
|---|---|---|---|
| 5,353,218 A | 10/1994 | De Lapa et al. | 705/14 |
| 5,380,991 A | 1/1995 | Valencia et al. | 235/383 |
| 5,459,306 A | 10/1995 | Stein et al. | 235/383 |
| 5,483,049 A | 1/1996 | Schulze, Jr. | 705/14 |
| 5,687,322 A | 11/1997 | Deaton et al. | 705/14 |
| 5,761,648 A | 6/1998 | Golden et al. | 705/14 |
| 5,822,735 A | 10/1998 | De Lapa et al. | 705/14 |
| 5,848,396 A | 12/1998 | Gerace | 705/10 |
| 5,855,007 A * | 12/1998 | Jovicic et al. | 705/14 |
| 5,870,723 A | 2/1999 | Pare, Jr. et al. | 705/39 |
| 5,905,246 A * | 5/1999 | Fajkowski | 235/375 |
| 5,915,243 A * | 6/1999 | Smolen | 705/14 |
| 5,918,014 A * | 6/1999 | Robinson | 395/200.49 |
| 5,918,211 A * | 6/1999 | Sloane | 705/16 |
| 5,923,552 A * | 7/1999 | Brown et al. | 364/468.06 |
| 5,933,811 A | 8/1999 | Angles | 705/14 |
| 5,950,173 A * | 9/1999 | Perkowski | 705/26 |
| 5,970,469 A * | 10/1999 | Scroggie et al. | 705/14 |
| 5,970,472 A * | 10/1999 | Allsop et al. | 705/26 |
| 6,012,039 A * | 1/2000 | Hoffman et al. | 705/14 |
| 6,064,979 A * | 5/2000 | Perkowski | 705/26 |
| 6,321,208 B1 | 11/2001 | Barnett et al. | 705/14 |

FOREIGN PATENT DOCUMENTS

| | | |
|---|---|---|
| EP | 0 822 535 A2 | 2/1998 |
| JP | 07-306654 | 11/1995 |
| JP | 08-115361 | 5/1996 |
| JP | 09-231263 | 9/1997 |
| JP | 10-143563 | 5/1998 |
| JP | 10-187320 | 7/1998 |
| WO | WO 93/15466 | 8/1993 |
| WO | WO 95/16971 | 6/1995 |
| WO | WO 97/23838 | 7/1997 |
| WO | WO 97/31322 | 8/1997 |
| WO | WO 98/18093 | 4/1998 |

OTHER PUBLICATIONS

Nikkei Multimedia for Business (Sep. 1998) No. 38, pp. 66-71.
Nikkei Multimedia for Business (Mar. 1998) No. 32, pp. 118-123.
Nikkei PC 21, vol. 3, No. 10, pp. 228-231, Nikkei PB, 1998.
2nd 'Net Bank Opens for Business, John Fontana, Communicationsweek, p. 46, Nov. 4, 1996.
IntelliQuest and Coolsavings Offer Innovative Online Customer Relationship Management Program for Technology Vendors, Business Wire, Sep. 30, 1998.
IntelliQuest Looks for Interaction with Loyalty, Web Traffics Programs, Electronic Advertising & Marketplace Report, Oct. 20, 1998.
Catalina Marketing Corporation News Letter : Catalina Marketing Online Launch to Include More than 1.600 California Stores, Feb. 11, 1996.
Catalina Marketing Corporation News Letter: San Jose Consumers Can Now Plan Supermarket Shopping in Cyberspace—New Internet Service Saves Shoppers Time and Money—Apr. 19, 1996.
SuperMarkets Online: Internet Coupon Security Breakthrough Removes Major Obstacle to On-line Packaged Goods Advertising Augus 5, 1997.
SuperMarkets Online: Internet and Food Industries Embrace Secure Online Coupon Format, Dec. 1, 1997.
In this Computer Age, Who Needs Coupons?, The New York Times, Jun. 15, 1989.[1].
Interactive Cable System Receives Strong Response, Direct Marketing, pp. 9-10, Dec. 1992.
SLED Internet Directory Distributes Electronic Coupons, PR Newswire, May 9, 1994.
PNC Bank Announces Internet Site, Plans Comprehensive Service Expansion, Business Wire, Jun. 13, 1996.
E-Mail from Mike Kacaba Regarding Phase One Requirements Document Version 1.0, Dated Sep. 19, 1995 and Draft Requirements Document Attached to that E-Mail.

* cited by examiner

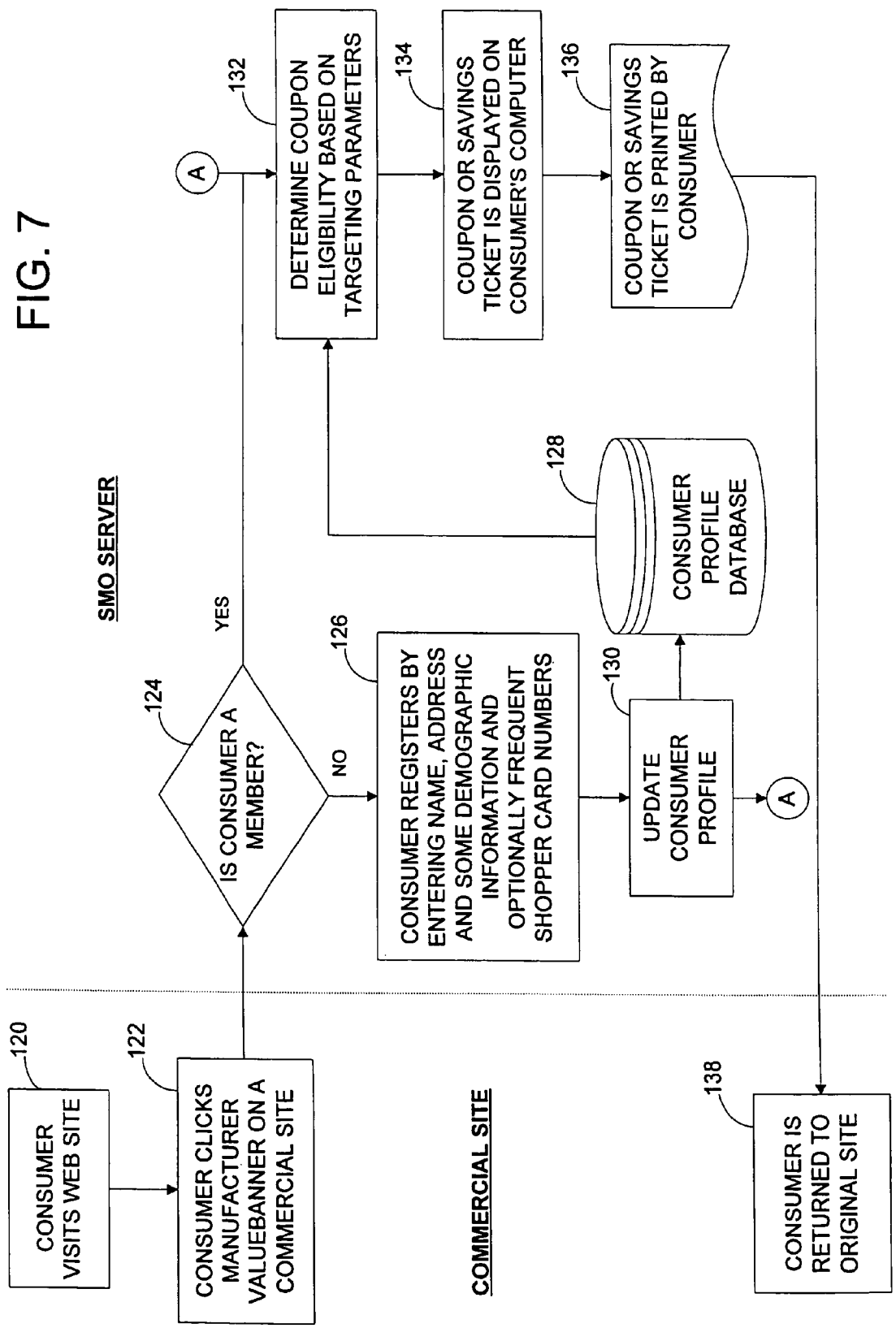

SYSTEM AND METHOD FOR DISTRIBUTING INFORMATION THROUGH COOPERATIVE COMMUNICATION NETWORK SITES

BACKGROUND OF THE INVENTION

This invention relates generally to systems for delivering promotional and other information to consumers who shop in retail establishments and, more particularly to systems for delivering incentives and related information to consumers via a computer network that links the consumers to network sites provided by product retailers and by product manufacturers. The invention is disclosed in the context of the supermarket packaged goods industry, but it will be appreciated as this description proceeds that the invention also has application in other contexts.

In the packaged goods industry, a relatively small number of major manufacturers supply goods to a much larger number of retailers throughout the country. Both the manufacturers and the retailers have a need to communicate to consumers with respect to currently offered "special" or "deal" items that are available in selected areas. The goals of the manufacturers and retailers in this regard are similar and sometimes overlapping, but are not usually identical. Manufacturers may wish to offer incentives in the form of discount coupons, rebates, free samples, contests, sweepstakes and so forth, and may also wish to distribute product information, recipes, questionnaires and surveys, audio messages, and other forms of advertising. Retailers, on the other hand, may wish to offer price markdowns for specific manufacturers' products, or may also wish to distribute advertising information pertaining to the retailers' special features being offered. Manufacturers' offers are typically national in scope, whereas retailers' specials are generally local to a specific geographical region.

There is a trend toward the establishment of Internet sites by both manufacturers and retailers of packaged goods. Each such site or "Web page" provides a wealth of information about a specific manufacturer of retailer, and also provides an alternative way of distributing incentive and advertising information to consumers who also have access to a computer network. Traditional channels for the distribution of incentive offers and other forms of advertising are the newspaper, magazine, television and radio media. Of these, the print media provide the most common and familiar way of distributing advertising and incentives in the form of discount coupons, free samples, and the like. Discount coupons may also be distributed in retail stores, either from kiosks or at the checkout stand in response to the consumer's purchase of some preselected item or items. The latter technique is well documented in prior patents issued to the same assignee as the present application; e.g., U.S. Pat. No. 4,723,212, "Method and Apparatus for Dispensing Discount Coupons."

Although a consumer may locate any manufacturer's offers or retailer's product "specials" by exploring each of the manufacturers' and retailers' computer Web sites, most consumers will not have ready access to all of these sites and will not normally be motivated to search for special product deals or other promotions in this manner. One possible solution is to provide a central cooperative network site having a database of retailer specials and manufacturer offers. Once connected to the cooperative site, the consumer can locate retailer specials and manufacturer offers available in a selected geographical area, designated by postal code. A drawback to this approach is that establishment and maintenance of the cooperative site must be well advertised to attract a large number of consumers, but retailers and manufacturers are understandably reluctant to promote a cooperative central site that will potentially provide consumers with information about competitive retailers or competitive manufacturers' products. Accordingly, there has been a trend toward the establishment of independent network sites for both manufacturers and retailers. While this trend is understandable, since it addresses the need for each manufacturer to provide information about its own products, and for each retailer to identify its own special deals, an arrangement of multiple, completely independent network sites for manufacturers and retailers does not efficiently deliver information to a large number of consumers.

It will be appreciated, therefore, that there is still need for improvement in the manner in which incentives, promotions and other information are delivered to consumers outside of the environment of a retail store. The present invention addresses this need.

SUMMARY OF THE INVENTION

The present invention resides in a method and system for delivering product offers and related information to consumers over a communication network. Briefly, and in general terms, the method of the invention comprises the steps of storing the conditions of manufacturer offers, pertaining to multiple product manufacturers, in a database associated with a cooperative communication network site; storing the conditions of retailer special deals, pertaining to multiple retailers, in the database associated with the cooperative communication network site; and providing information from the database to a consumer in response to a consumer request made from a consumer communication node connected to the communication network, but without regard for whether the consumer communication node is logged in to the cooperative communication site, or to a retailer or manufacturer network site, or to another independently administered network site.

In the context of the present invention, the terms "log in" or "log on" mean connecting to, or simply viewing, a selected server site. When "logging in" to a server site, a consumer may also supply requested information to the site, but not necessarily.

More specifically, the step of providing information from the database includes receiving a query from a consumer logged in to a network site of a manufacturer; then, in response to the query from the consumer, providing a geographically limited list of retailers having special deals pertaining to product offers made by the manufacturer. The next steps of the method are receiving offer selection data from the consumer through the manufacturer network site, and either transmitting details of the selected offers to the manufacturer network site for use by the consumer, or linking the consumer directly to a selected retailer network site to view the available offers.

Alternatively, the method may include receiving a query from a consumer logged in to a network site of a retailer; then, in response to the query from the consumer, providing a list of manufacturer offers available at the retailer; and later receiving offer selection data from the consumer through the retailer network site, and transmitting details of the selected offers to the retailer network site for use by the consumer. The step of providing manufacturer offers may further include targeting offers based on consumer demographic data or personal preferences previously established by the consumer, and including in the provided manufacturer offers at least some that are specific to the consumer who made the query, based on the consumer's profile. Further, the targeted offers may be formatted into a personal page produced specifically for the consumer based on his or her personal preferences. The step of providing manufacturer offers may also include receiving from the consumer an identification code used by the consumer in making retail purchases; using the consumer identification code to target incentives based on the consumer's prior shopping behavior; and including in the provided manufacturer offers at least some that are specific to the consumer who made the query, based on the retrieved information pertaining to the consumer's prior shopping behavior.

In accordance with another aspect of the invention, the method further includes receiving the consumer's a postal code; and using the consumer's postal code to customize the information provided to the consumer's local geographical area. The postal code provides a key to access internal or external sources of geo-demographic data, from which targeted information can be generated for transmission to the consumer.

The invention may also be defined as an interactive communication system for distributing information to consumers through a communication network sites having at least one manufacturer communication network site, administered by a manufacturer of products sold to consumers through retailers, and at least one retailer communication network site, administered by a retailer of products purchased from manufacturers and sold to consumers. The interactive communication system comprises a cooperative communication network site including a database containing information pertaining to manufacturer offers to consumers and retailer special deals for consumers; at least one consumer communication node connected to the communication network and logged in to a communication network site selected from the manufacturer site, the retailer site and the cooperative site; means at the cooperative communications node, for receiving a consumer request made through the consumer communication node, even if the consumer node is not logged in to the cooperative communication site directly; means at the cooperative communication node, for responding to the consumer request by providing product offer information stored in the database; and means installed at cooperating manufacturer and retailer sites, for providing communication linkage between the cooperative communication node and a consumer node logged in to one of the manufacturer or retailer sites, whereby the consumer node receives the product offer information as if logged in directly to the cooperative communication node.

More specifically, in the interactive communication system the means for responding to a consumer request includes means, operative when the request is made through a manufacturer site, for transmitting a list of retailers having special deals pertaining to product offers made by the manufacturer associated with the site through which the request was connected. Alternatively, the means for responding to a consumer request includes means, operative when the request is made through a retailer site, for transmitting a list of manufacturer offers available at the retailer associated with the site through which the request was connected. The manufacturer offers may be targeted or non-targeted. In one embodiment of the invention, for generating targeted offers, the means for transmitting a list of manufacturer offers includes a consumer-specific database for use in selecting offers based on consumer demographic data, or on product preferences expressed by the consumer, or on past shopping activity of the consumer.

Another aspect of the invention may be defined as a method for distributing purchase incentives to consumers over a communication network, comprising the steps of storing data pertaining to purchase incentives in a database associated with a purchase incentive server site coupled to the network; and, for at least one purchase incentive, displaying an advertising banner on at least one independent commercial network site, for viewing by consumers; and, in response to selection of the banner by a consumer logged in to the independent commercial network site, providing a purchase incentive directly to the consumer for viewing and printing, whereby the consumer can obtain a selected product incentive directly while logged in to the commercial site. More specifically, this method is used in a presently preferred embodiment of the invention to distribute manufacturer product purchase incentives to consumers. The method may also include the step of conditioning the step of providing a product purchase incentive on receipt of registration information from the consumer. Thus, as in the distribution of offers described above, distribution of incentives using the advertising banner may also be targeted or non-targeted. Non-targeted distribution means that an incentive or other information is distributed without regard to who the consumer is or where the request for information originates. Targeted distribution may be conditioned on demographic data, consumer profile data provided by the consumer, or consumer purchasing behavior. In addition, targeted distribution resulting from use of an advertising banner may also make use of the identity of the commercial site from which the banner was selected. In other words, an offer may be conditioned in some way on the identity of the commercial site that the consumer was connected to when the request was made using the advertising banner. For example, a consumer connected to a retailer site may be treated differently from a consumer connected to a non-retailer site.

It will be appreciated from the foregoing that the present invention represents a significant advance in techniques for distribution of information to consumers using a communication network. In particular, the invention, provides for the distribution of information in response to consumer requests, regardless of whether the requests are made while logged in to a manufacturer network site, a retailer network site, or a cooperative network site, or another third-party site. The invention also encompasses the distribution of purchase incentives directly to a consumer who logs in to an independent commercial site and selects a banner advertising a specific product incentive. Other aspects and advantages of the invention will become apparent from the following more detailed description, taken in conjunction with the accompanying drawings.

BRIEF DESCRIPTION OF THE DRAWINGS

FIG. 7 is a block diagram showing implementation of a "value banner" to provide an offer or incentive directly to a consumer.

DESCRIPTION OF THE PREFERRED EMBODIMENTS

Figure 1:
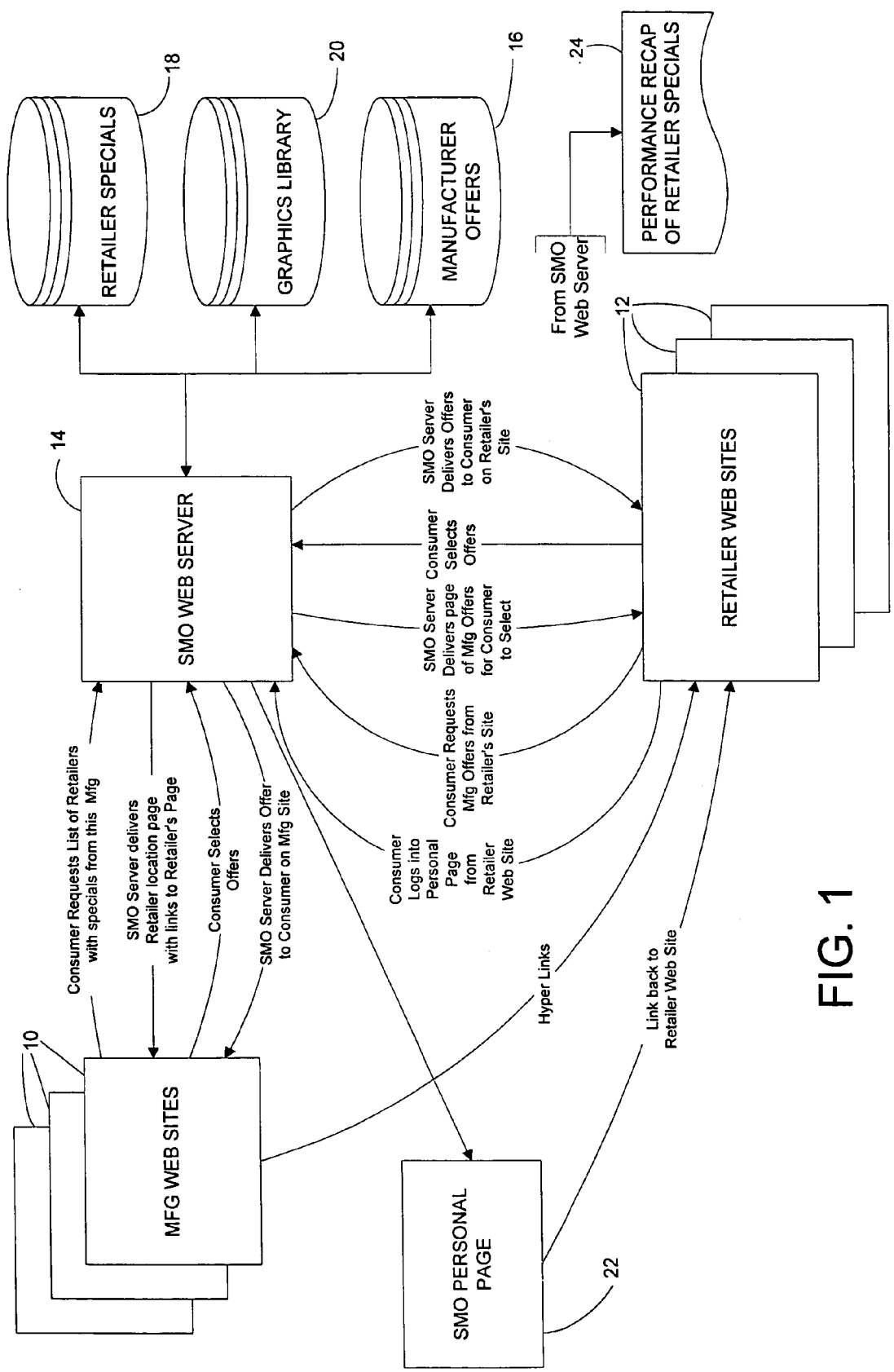
FIG. 1 is block diagram illustrating the interconnection of multiple computer networking sites in accordance with the present invention.

As shown in the drawings for purposes of illustration, the present invention pertains to an interconnected system of networked sites, and a method for its use, for efficient delivery of manufacturer offers and retailer "specials" to consumers accessing the interconnected system through a computer or similar device. Prior to this invention, a consumer with communication network access would have to access an appropriate site in order to obtain manufacturer offer information or retailer special deal information. More specifically, the consumer would need to know the network addresses for all of the manufacturers whose offers were of interest to the consumer, and the network addresses of all of the retailers whose special deals were of interest. Alternatively, the consumer could access the desired information by direct access to a cooperative site containing all the manufacturer and retailer information.

In accordance with the invention, a database of manufacturer offers and retailer special deals is maintained at a cooperative network site and consumers can access at least a subset of the data in the database from any manufacturer or retailer network site. Thus it makes little or no difference which site, of many manufacturer and retailer sites, that the consumer is logged in to when initiating a request. The consumer may also request and receive manufacturer offer data and retailer special deal data directly from the database at the cooperative site. Use of the invention, therefore, results in exposure of the manufacturer offers and retailer special deals to many more consumers than in the past. These and other aspects of the invention will now be described in more detail.

As shown in FIG. 1, the invention is implemented in the environment of a computer communication system, such as the Worldwide Web, in which multiple computer systems, referred to as Web sites, are interconnected through a complex set of communication links. As is well known, consumers may connect to the Web through personal computers and access information at a variety of selected Web sites. In network terminology, computer systems at a Web site are also referred to as servers, since they "serve" data to another computer that requests the information. The requesting computer is then referred to as the "client." Web sites that are pertinent to the present invention include multiple manufacturer sites, indicated by reference numeral 10, multiple retailer sites 12, and a cooperative server 14, the latter being referred to in the drawings and in this description as the SMO (SuperMarkets Online) Web server. As will be explained in more detail, the SMO server 14, maintains associated database files that may be conveniently categorized as manufacturer offers 16 and retailer specials 18. The SMO server 14 also has access to a graphics library 20 for use in communicating data to the manufacturer or retailer sites 10 and 12.

The comments linking the manufacturer site 10 with the SMO server 14 illustrate a typical dialog between a consumer logged in to a manufacturer site and the SMO server. First, the consumer requests a list of retailers (in the consumer's area) that have any manufacturer offers from this particular manufacturer. The SMO server 14 delivers a list offers and a list of retailer names and locations to the manufacturer site 10, which makes these lists immediately available to the consumer, through a Web browser on the consumer's personal computer. The SMO server 14 may also provide links to the listed retailer sites for the consumer to use. The consumer may then select from among the offers and transmit the selections back to the SMO server 14. Finally, the SMO server 14 delivers details of the selected offer or offers back to the consumer on the manufacturer site 10.

If the consumer logs in to a retailer site 12, a similar dialog takes place, but may also use the concept of a "personal page" for the consumer. The personal page, indicated diagrammatically at 22, is a consumer-specific profile that the consumer may optionally provide at the SMO server site 14, either by logging in directly to the SMO server or by logging in indirectly through a retailer site 12. In the personal page, the consumer list various shopping preferences, which permit the SMO server 14 to provide manufacturer offers that are more specific to those preferences. In the illustrative dialog shown in FIG. 1, the consumer first logs in to his or her personal page through the retailer site 12 and requests manufacturer offers. The SMO server 14 delivers a list of targeted or non-targeted manufacturer offers to the consumer, through the retailer site 12. The consumer selects from among the manufacturer offers, and the SMO servers delivers details of the selected offers to the consumer through the retailer server site. A performance recap pertaining to the activity with respect to retailer specials, is periodically transmitted to appropriate manufacturers, as indicated at 24.

Figure 2:
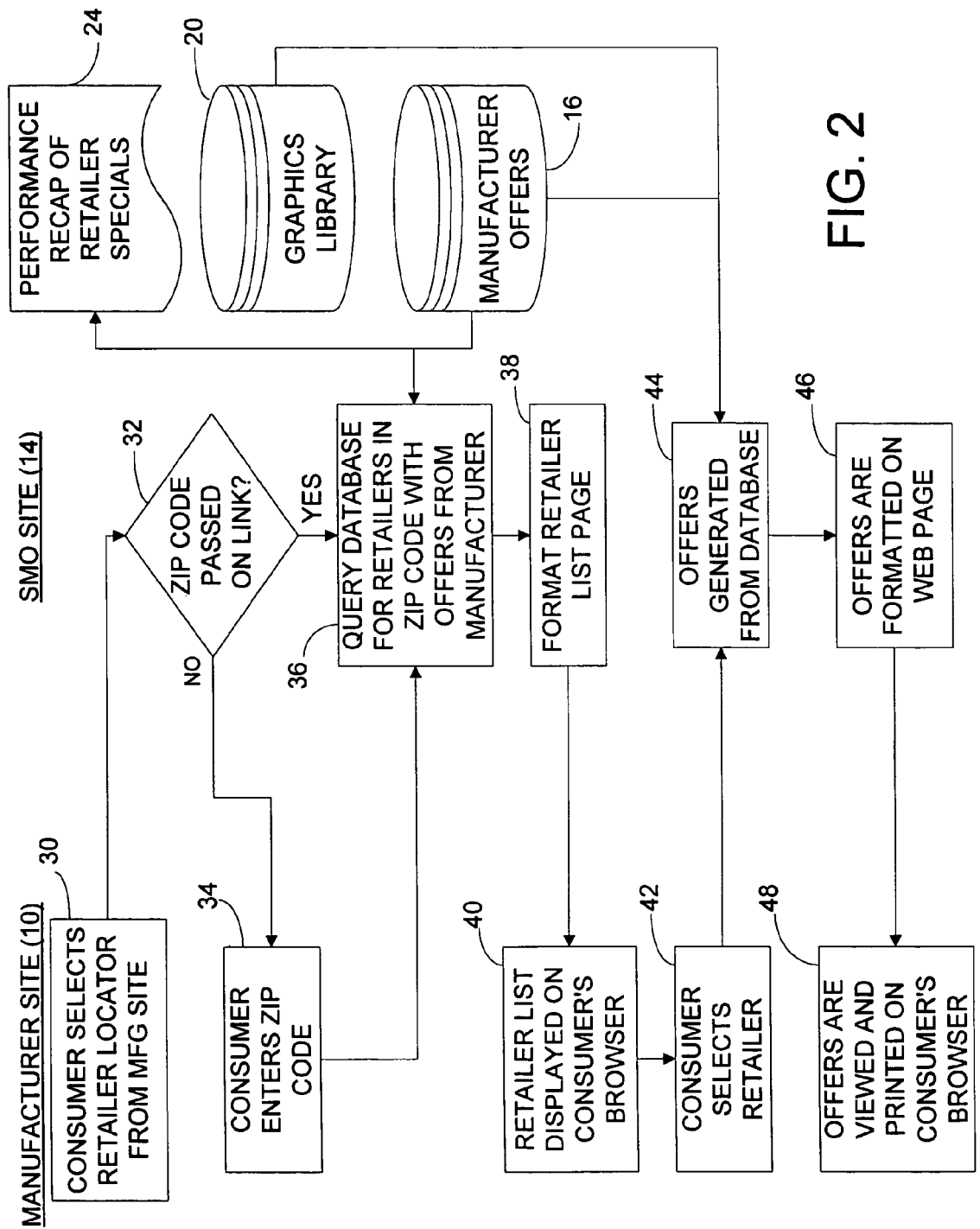
FIG. 2 is a flowchart depicting a typical interaction between the interconnected network sites and a consumer logged in to a manufacturer network site.

FIG. 2 shows in more detail the operations performed at the manufacturer site 10 and the SMO server site 14. As shown in block 30, the consumer may select to have a retailer listing delivered, i.e., a list of retailers that handle the manufacturer's products. At the SMO site 14, the server checks, as indicated in block 32, to determine if the consumer's postal (ZIP) code has already been transmitted over the link from the manufacturer site 10. (At some manufacturer sites, the consumer may be asked to provide a ZIP code when logging in.) If not, the consumer is now asked to enter a ZIP code. If so, this step is bypassed. Once the ZIP code is obtained, the SMO site 14 queries the database 16 for a list of retailers in that ZIP code having offers from the manufacturer, as indicated in block 36. The SMO server 14 then formats a retailer list page, as indicated in block 38, and transmits this list page to the manufacturer site 10. This retailer list is displayed through the consumer's network browser, as indicated in block 40. The consumer selects a retailer, as indicated in block 42, and in response the SMO server 14 generates the complete offers from the database 16, as indicated in block 44. The selected offers are formatted on the Web page of the SMO site, as indicated in block 46, and this page is viewed and, optionally, printed by the consumer as indicated in block 48, using standard features of the consumer's network browser.

Figure 3:
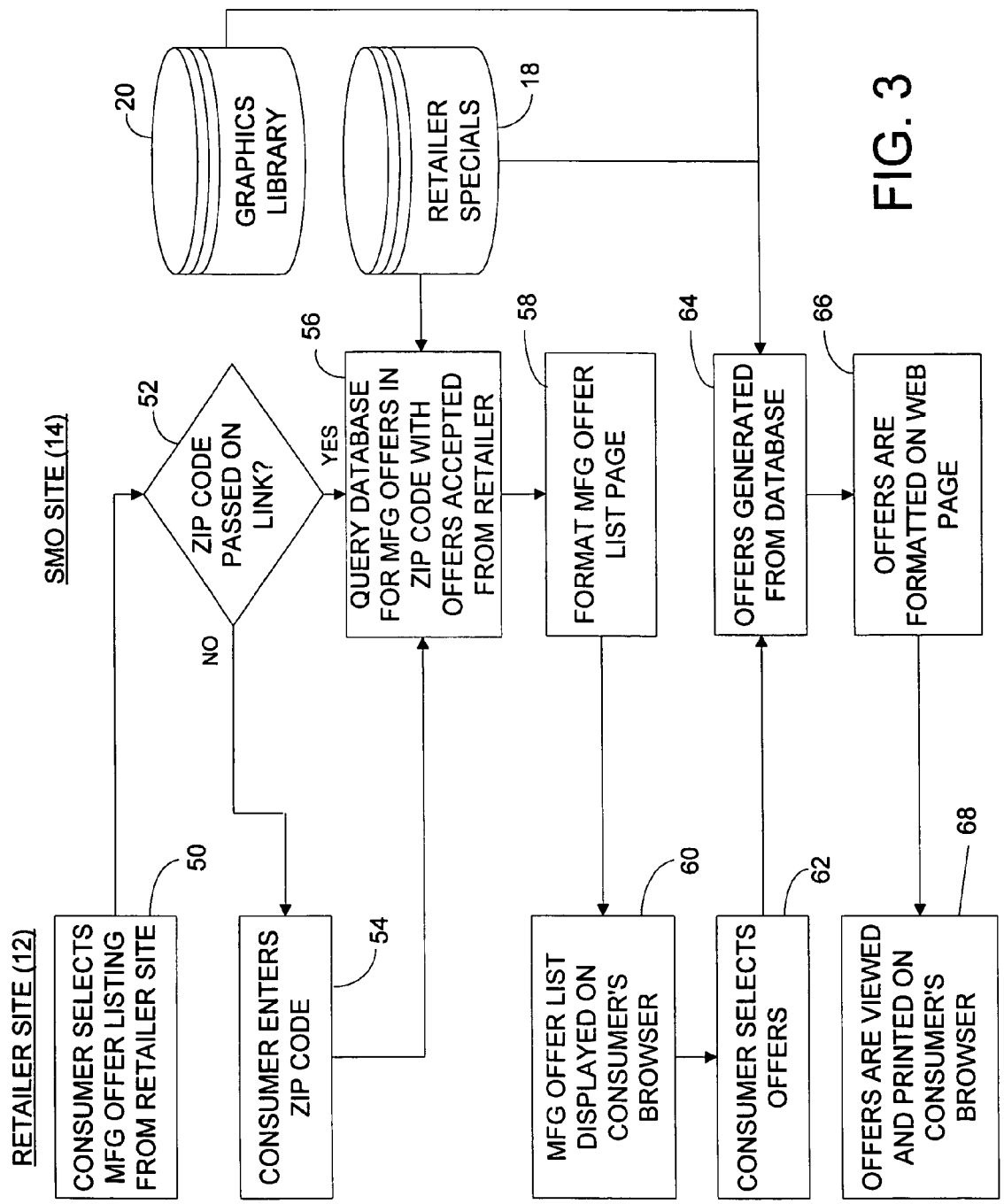
FIG. 3 is a flowchart depicting a typical interaction between the interconnected network sites and a consumer logged in to a retailer network site.

FIG. 3 shows in more detail the operations performed at the retailer site 12 and the SMO server site 14 when the consumer logs in at the retailer site. First the consumer requests a manufacturer offer listing from the retailer site, as indicated in block 50. The SMO server 14 checks, as indicated in block 52, to determine if a ZIP code has already been transmitted to the server. If not, the consumer is asked to submit a ZIP code, as indicated at 54. If so, this step is bypassed. Then the SMO server 14 checks the retailer database 18 for manufacturer offers accepted by the retailer, as indicated in block 56. A manufacturer offer list is formatted, as indicated in block 58, and displayed through the consumer's network browser, as indicated in block 60. The consumer may then select from among the offers, as indicated in block 62. The selected offers are then generated in detail from the database 18, as indicated in block 64, formatted on the server Web page, as indicated in block 66, and viewed or printed through the consumer's network browser, as indicated in block 68.

Figure 4:
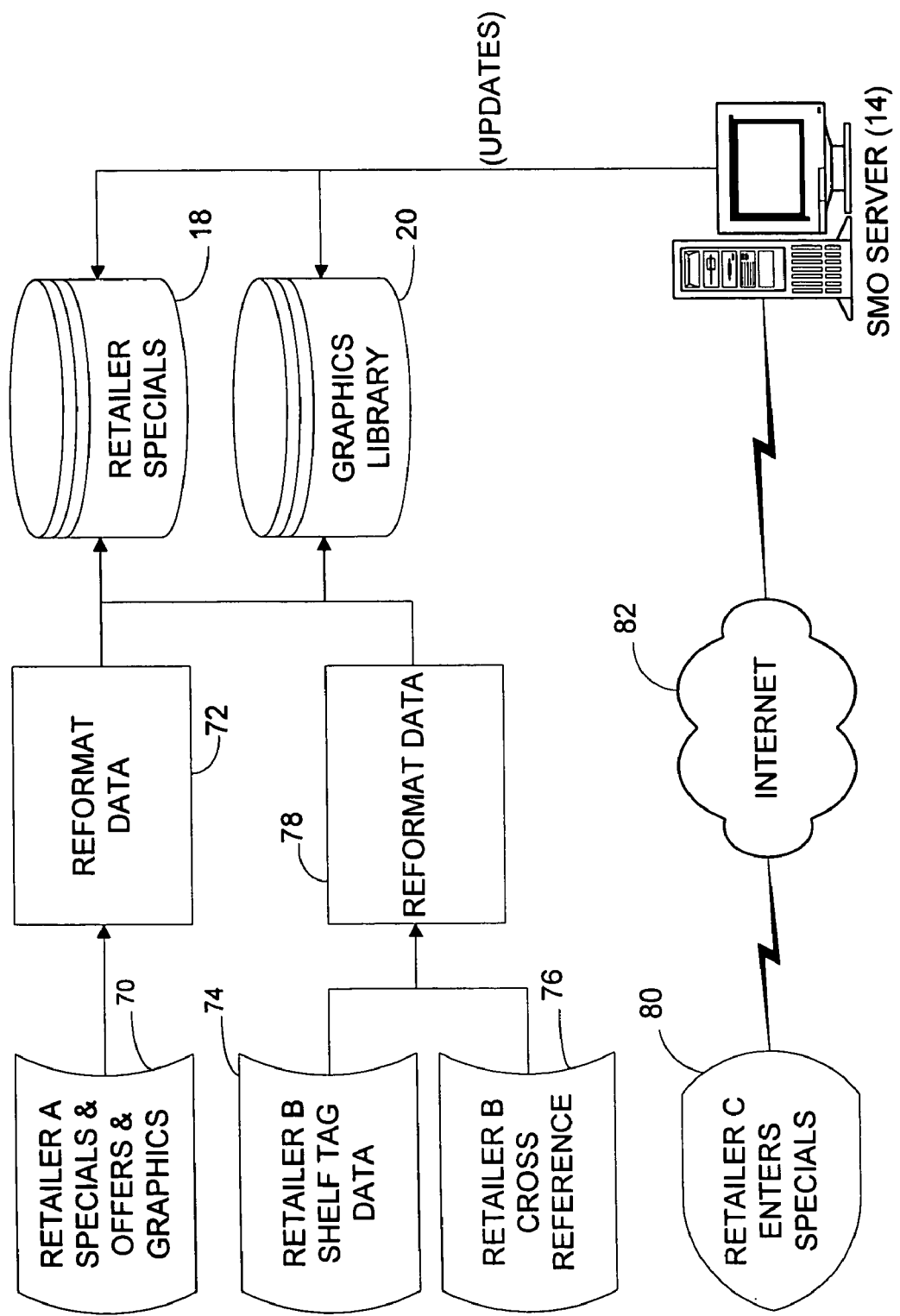
FIG. 4 is block diagram showing three techniques for maintaining a database of retailer specials at a cooperative network site.

Operation of the cooperative site is, of course, dependent on maintenance of the manufacturer and retailer databases 16 and 18 with all of the current manufacturer offers and retailer specials. Options for maintaining the retailer data are shown in FIG. 4. Some retailers may choose to supply data on their special deals, and related graphics data, on a diskette or some other storage medium, as indicated in block 70. Data in this form is reformatted by the administrator of the SMO server 14, as indicated in block 72, and input to the database 18 and 20. Other retailers may be in a better position to supply update data in the form of shelf tag data 74 that they also use to generate printed price shelf tags for their stores, together with cross-reference data 76 needed to complete the current retailer specials data updates. These data would also need to be reformatted, as indicated in block 78, and input to the databases 18 and 20. Another approach for inputting retailer specials data is for the retailer to input the data through an Internet input screen, as indicated at 80, the contents of which are transmitted onto the Internet 82 and downloaded by the SMO server 14 in order to update the databases 18 and 20.

Figure 5:
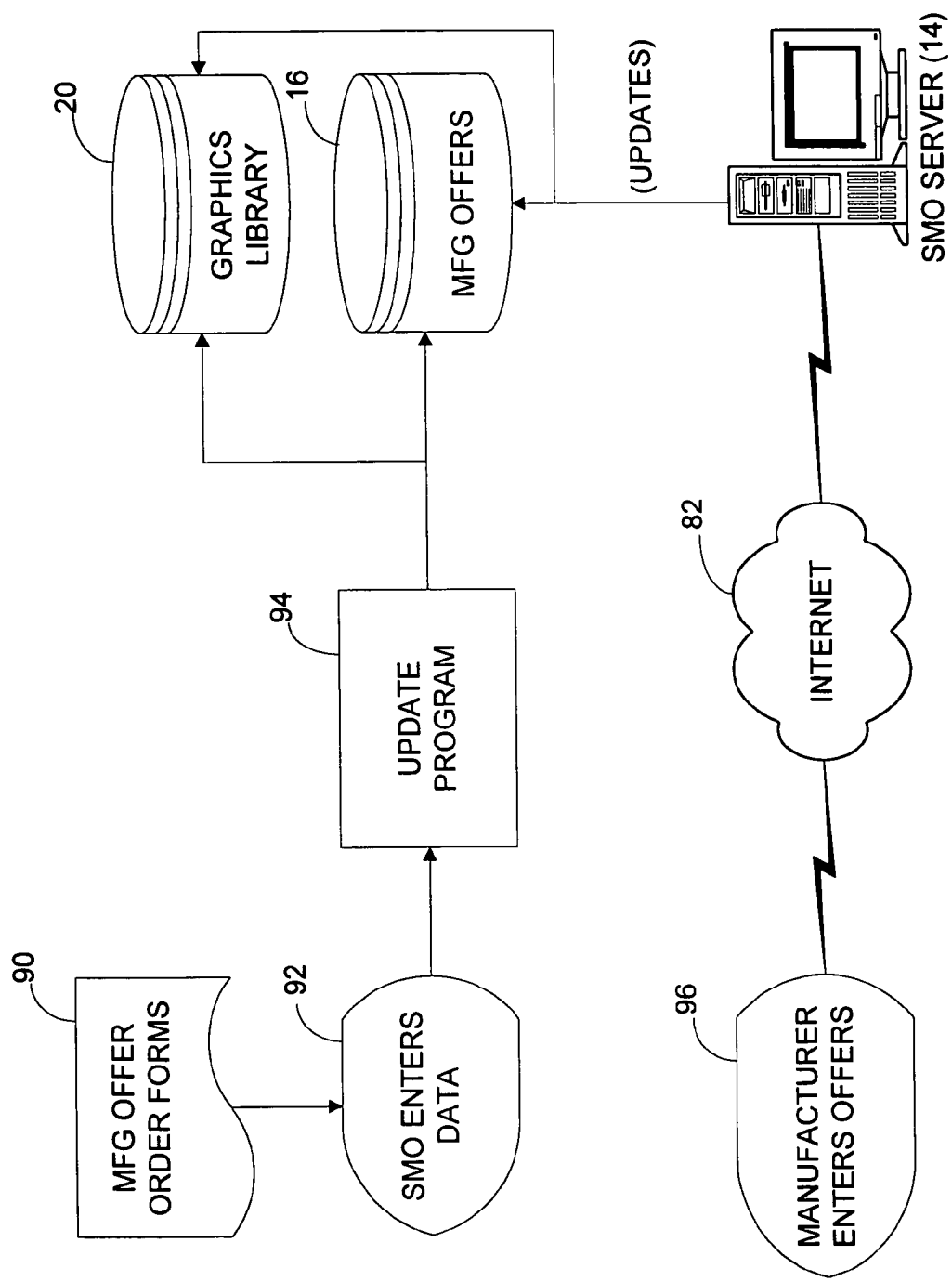
FIG. 5 is a block diagram showing two techniques for maintaining a database of manufacturer offers at a cooperative network site.

FIG. 5 shows how manufacturers input update data to the manufacturer offer database 16. In one approach, the manufacturer supplies the data on input forms 90, which are entered at the SMO site 14, as indicated at 92, and transmitted to the databases 16 and 20 by means of an update program 94 executed at the SMO site. Alternatively, the manufacturer may enter offer data through an Internet form, as indicated at 96, and the SMO server 14 then downloads the manufacturer data from Internet and updates the databases 16 and 20.

Figure 6:
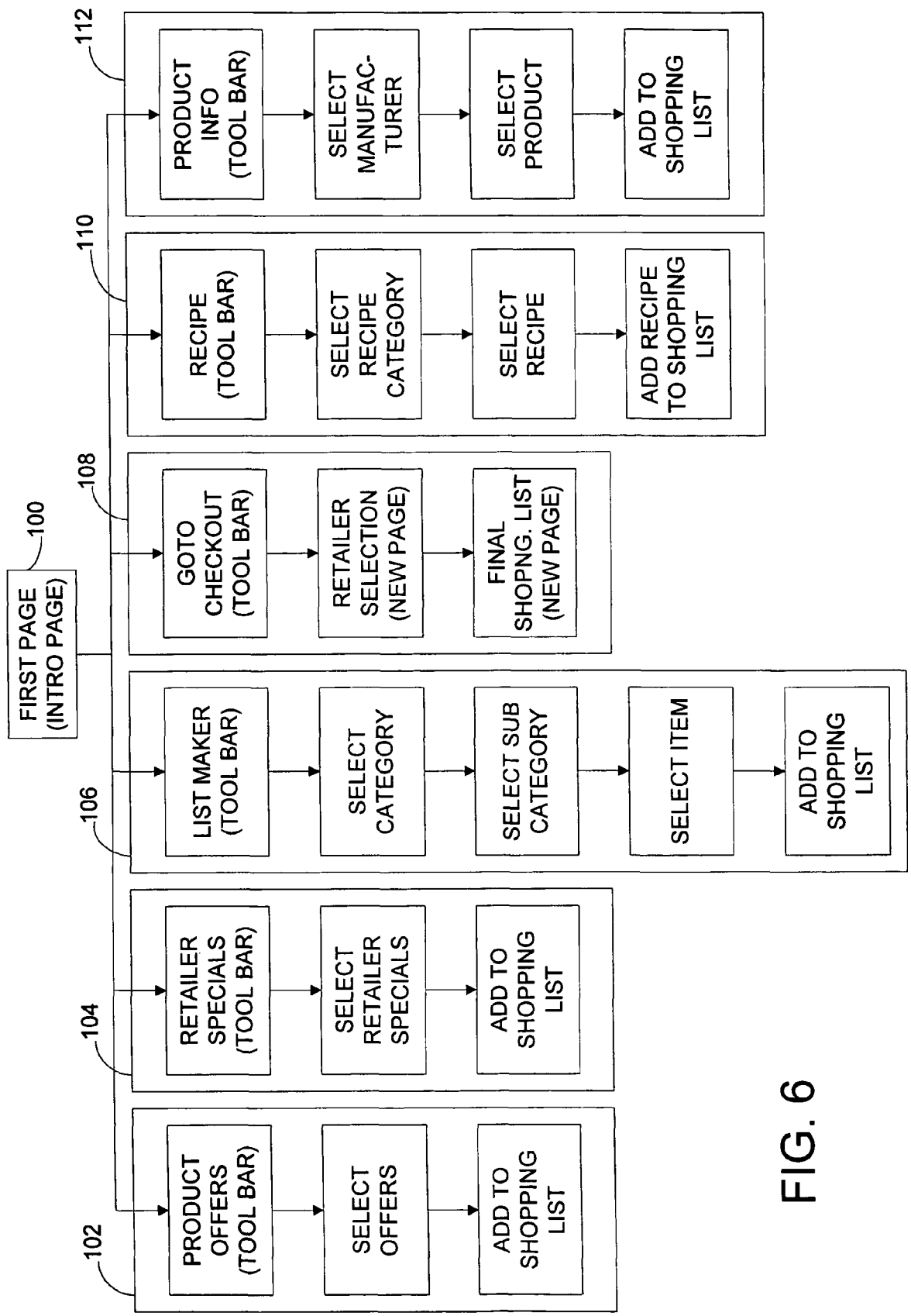
FIG. 6 is a block diagram showing a menu structure presented to a consumer using a personal page feature.

When a consumer agrees to the establishment of a personal page, he or she may access the page after logging in to a retailer site 12 or the cooperative site 14, using an appropriate password or other security feature, and will then encounter a menu structure similar to the one shown in FIG. 6. First an introductory page 100 is presented and the consumer will be offered multiple further choices on a displayed "tool bar," as indicated on the upper row of blocks in FIG. 6. Each tool bar button takes the consumer to a succession of functions, as indicated by the columns of blocks in the figure. The tool bar options include selecting from among product offers 102, selecting retailer specials 104, making a personal list of products 106, proceeding to "final checkout" 108, selecting one or more available recipes 110, and selecting product information 112.

When product offers are selected (column 102), the consumer may choose from a list of product offers and place the selections in a shopping list, which is printed as the consumer selects the "final checkout" procedure. Similarly, when retailer specials are selected (column 104), the consumer may choose from a list of retailer specials and add these to the shopping list. If the "list maker" is selected (column 106), the consumer may choose a product category, then a sub-category, then a product within the sub-category, which is added to the consumer's shopping list. Similarly, recipes (column 110) and product information (column 112) may be selected and added to the consumer's shopping list. The final checkout function (column 108) allows the consumer to select a retailer and print a final shopping list to take to the store.

As it pertains to the present invention, the personal page feature, presents the consumer with manufacturer offers and retailer specials that are personalized as a result of the consumer's having used the personal page to better define his or her shopping preferences. The lists of manufacturer offers and retailer specials may also be personalized as a result of the consumer's prior shopping activity. As a result, the personal page allows the presentation of product offers and retailer specials to be focused on individual consumers, based on their shopping preferences expressed in the personal page or by prior shopping activity.

The system specifics for gathering shopping activity data will depend on various design details. In brief, the shopping behavior of consumers is routinely tracked if the consumers provide some form of unique identification during purchase transactions, such as a check-cashing card, a magnetically encoded check, a frequent shopper card, or other form of identification. The purchase of any number of items can then be associated with the specific consumer id., and a systems administrator maintains a database of consumer purchase histories. When a consumer logs in to the system, he or she may voluntarily supply the consumer id. used for in-store purchases. The consumer may be rewarded in some manner for supplying this information. The consumer id. will be used for all subsequent sessions in which the consumer logs in to the site Once the linkage is established, the consumer purchase history data or targeted incentives needed to support this capability of the invention is transferred from the shopper purchase history system to the on-line system of the present invention, so that, when the consumer visits the site, a targeted incentive may be delivered based on a selected event, or a combination of events, in the consumer's past shopping history.

It will be understood that each of the cooperating retailer and manufacturer sites 12 and 10 must be appropriately designed or modified to provide the necessary linkages to the cooperative (SMO) site 14 for consumers logging in to those sites. Specifically, when a consumer logs in to a manufacturer site 10 looking for a specific product, the manufacturer site obtains from the cooperative site a list of retailers that carry this product, and presents the list to the consumer. The manufacturer site 10 further interacts with the consumer to obtain his or her selection of offers and then presents the details of these offers to the consumer, who remains unaware that the data are being supplied from the cooperative site. Similarly, each cooperating retailer site must present the consumer with a list of manufacturer offers obtained from the cooperative site 14, and then present details of the selected offers to the consumer. Again, the consumer remains unaware that the data are being supplied from the cooperative site.

The cooperative networking aspect of the invention is enhanced by use of the personal page feature made available to consumers who log in to the cooperative site 14 or to a retailer site 10. The personal page, which is a feature that is invoked only at the option of the consumer, provides a mechanism for the SMO server 14 to generate more focused or personalized manufacturer offers. Once a consumer consents to the establishment of a personal page by supplying requested personal, demographic or other information, the SMO server 14 maintains a database for the specific consumer, including the consumer's personal preferences for products, as expressed by the consumer when requested, or as indicated by the consumer's prior shopping activity. In accordance with this aspect of the present invention, a consumer who has logged in to the system is asked to supply a consumer id. or code used for in-store purchases. The consumer id. may be a check-cashing card number, or other form of identification that allows the system to access the consumer's purchasing history, and then select one or more manufacturer's offers based on some aspect of the consumer's prior shopping history. The selected offer or offers are transmitted to the consumer in response to a request for a list of manufacturer offers available at a particular retailer.

In accordance with another important aspect of the invention, product incentives or other promotional information can be delivered directly to a consumer logged in to any commercial site, such as a manufacturer's or retailer's site, through use of a "banner" displayed at that site. The banner provides an effective "short-cut" to the promotional information or incentive offer advertised in the banner. The consumer does not need to browse through a list of offers or first find a list of retailers. He or she visits a commercial Web site, as indicated at 120 (FIG. 7), and simply "clicks" on the banner, as indicated in block 122. The banner typically advertises a single product incentive. This action automatically links the consumer to the SMO server site (14, FIG. 1), which provides the incentive to the consumer. Although the incentive could be provided unconditionally, in the presently preferred embodiment of the invention the "banner" feature provides incentives only to consumers who have registered as "members." Thus the SMO server first checks to determine if the consumer making the request is a member, as indicated in block 124. This determination can be made using any of various available techniques, such as checking the consumer's electronic mail address. Another technique is to make use of a "cookie," which is a small data record stored by the server in the consumer's computer, to help identify or provide information about the consumer on subsequent connections to the same site. If the consumer is not a member, he or she is asked to provide a name, address, and a limited amount of demographic information, as indicated in block 126. Optionally, the consumer may provide a frequent shopper card number. This information is then used to update the consumer profile database 128, as indicated in block 130. If the consumer is already registered, the steps of registration and profile updating (blocks 126 and 128) are bypassed. Availability of the promotion or incentive may also be conditioned on eligibility, based on demographic or other consumer profile targeting parameters, as indicated in block 132. Finally, the incentive, in the form of a coupon or savings ticket, is displayed on the consumer's computer display, as indicated in block 134. The savings ticket is a document or record providing evidence that the consumer visited the site and qualified for an award. The savings ticket, which may also be described as a token, may also be printed, or recorded electronically or otherwise by the consumer, as indicated in block 136. At the end of this processing, the consumer is returned to the original commercial site from which the "banner" request was made, as indicated in block 138.

It will be appreciated from the foregoing that the present invention represents a significant advance in systems for the delivery of shopping offers, incentives and other information through a communication network, such as the Worldwide Web. In particular, the cooperative interconnection of manufacturer sites, retailer sites and a cooperative site allows consumers to review and select product offers regardless of whether logged in to a manufacturer site, a retailer site or the cooperative site. It will also be appreciated that, although a specific embodiment of the invention has been described for purposes of illustration, various modifications may be made without departing from the spirit and scope of the invention. Accordingly, the invention should not be limited except as by the appended claims.

We claim:

1. A computer network implemented method, comprising the steps of:
    transmitting from a consumer computer over the Internet to a Web site of a manufacturer a request for manufacturer incentives to purchase one of a product and a service offered by said manufacturer;
    in response to said request for manufacturer incentives, transmitting region data from said Web site of said manufacturer over the Internet to a remote Web site;
    in response to receipt of region data at said manufacturer's Web site, transmitting from said remote Web site to said Web site of said manufacturer at least one manufacturer incentive and at least one name and address of a retailer; and
    transmitting from said Web site of said manufacturer over the Internet to said consumer computer said at least one manufacturer incentive and said at least one name and address.

2. The method according to claim 1, wherein said step of transmitting from said remote site further comprises transmitting a link to a Web site of said retailer.

3. The method according to claim 1, further comprising the step of determining said at least one manufacturer's incentive and said at least one name and address of a retailer by querying, using said region data, a database from a server of said remote Web site.

4. The method according to claim 1, further comprising the steps of:
    transmitting from said consumer computer to said Web site of said manufacturer selection data indicating selection of said at least one manufacturer incentive;
    transmitting from said Web site of said manufacturer to said remote site said selection data;
    transmitting from said remote site to said Web site of said manufacturer details of the selected at least one manufacturer incentive; and
    transmitting from said Web site of said manufacturer to said consumer computer said details.

5. A computer network implemented system, comprising:
    means for transmitting from a consumer computer over the Internet to a Web site of a manufacturer a request for manufacturer incentives to purchase one of a product and a service offered by said manufacturer;
    means for, in response to said request for manufacturer incentives, transmitting region data from said Web site of said manufacturer over the Internet to a remote Web site;
    means for, in response to receipt of region data at said manufacturer's Web site, transmitting from said remote Web site to said Web site of said manufacturer at least one manufacturer incentive and at least one name and address of a retailer; and
    means for transmitting from said Web site of said manufacturer over the Internet to said consumer computer said at least one manufacturer incentive and said at least one name and address.

6. The system according to claim 5, wherein said means for transmitting from said remote site said list further comprises means for transmitting a link to a Web site of said retailer.

7. The system according to claim 5, further comprising means for determining said at least one manufacturer's incentive and said at least one name and address of a retailer by querying, using said region data, a database from a server of said remote Web site.

8. The system according to claim 5, further comprising:
    means for transmitting from said consumer computer to said Web site of said manufacturer selection data indicating selection of said at least one manufacturer incentive;
    means for transmitting from said Web site of said manufacturer to said remote site said selection data;

means for transmitting from said remote site to said Web site of said manufacturer details of the selected at least one manufacturer incentive; and means for transmitting from said Web site of said manufacturer to said consumer computer said details.

9. A computer program product for implementing on a network a method, comprising the steps of:

in response to receiving at a Web site of a manufacturer a request for manufacturer incentives to purchase one of a product and a service offered by a manufacturer transmitted from a consumer computer over the Internet, transmitting region data from a Web site of said manufacturer over the Internet to a remote Web site;

in response to receipt of region data at said manufacturer's Web site, transmitting from said remote Web site to said Web site of said manufacturer at least one manufacturer incentive and at least one name and address of a retailer; and transmitting from said Web site of said manufacturer over the Internet to said consumer computer said at least one manufacturer incentive and said at least one name and address.

* * * * *

UNITED STATES PATENT AND TRADEMARK OFFICE
CERTIFICATE OF CORRECTION

PATENT NO. : 8,224,691 B1  
APPLICATION NO. : 09/505632  
DATED : July 17, 2012  
INVENTOR(S) : Michael C. Scroggie et al.

Page 1 of 1

It is certified that error appears in the above-identified patent and that said Letters Patent is hereby corrected as shown below:

On the title page, insert Item (63) as follows:

--(63)  Continuation of application No. 08/873,974, filed on Jun. 12, 1997, now Pat. No. 7,966,222.--

Signed and Sealed this
Fourteenth Day of May, 2013

Teresa Stanek Rea
*Acting Director of the United States Patent and Trademark Office*